United States Patent
He et al.

(10) Patent No.: US 11,119,192 B2
(45) Date of Patent: Sep. 14, 2021

(54) AUTOMATIC DETECTION OF OVERHEAD OBSTRUCTIONS

(71) Applicant: HERE Global B.V., Eindhoven (NL)

(72) Inventors: Fangning He, Chicago, IL (US); David Doria, Oak Park, IL (US); Xin Chen, Evanston, IL (US)

(73) Assignee: HERE Global B.V., Eindhoven (NL)

( * ) Notice: Subject to any disclaimer, the term of this patent is extended or adjusted under 35 U.S.C. 154(b) by 347 days.

(21) Appl. No.: 16/213,261

(22) Filed: Dec. 7, 2018

(65) Prior Publication Data
US 2020/0182969 A1 Jun. 11, 2020

(51) Int. Cl.
*G01S 7/48* (2006.01)
*G01S 17/931* (2020.01)
*G01S 17/89* (2020.01)

(52) U.S. Cl.
CPC ............ *G01S 7/4808* (2013.01); *G01S 17/89* (2013.01); *G01S 17/931* (2020.01)

(58) Field of Classification Search
CPC ...... G01S 7/4808; G01S 17/931; G01S 17/89; G01S 2013/93273; G01S 7/4802; G01S 7/003; G01B 11/24; G01C 21/3602
See application file for complete search history.

(56) References Cited

U.S. PATENT DOCUMENTS

| | | | |
|---|---|---|---|
| 7,027,615 B2 | 4/2006 | Chen | |
| 8,212,660 B2 * | 7/2012 | Nugent | G01S 15/931 340/435 |
| 8,798,372 B1 | 8/2014 | Korchev et al. | |
| 10,137,890 B2 * | 11/2018 | Sakai | G05D 1/0088 |
| 10,552,689 B2 * | 2/2020 | Doria | G01S 17/89 |

(Continued)

FOREIGN PATENT DOCUMENTS

DE 102009018453 A1 10/2010
DE 102013017347 A1 4/2015
(Continued)

OTHER PUBLICATIONS

European Search Report for European Patent Application No. 19213902.0-1206 dated Apr. 28, 2020.
(Continued)

*Primary Examiner* — Mohammad K Islam
(74) *Attorney, Agent, or Firm* — Lempia Summerfield Katz LLC

(57) ABSTRACT

Methods, apparatuses, and systems are provided for detecting overhead obstructions along a path segment. One exemplary method includes receiving three-dimensional data collected by a depth sensing device traveling along a path segment, wherein the three-dimensional data comprises point cloud data positioned above a ground plane of the path segment. The method further includes identifying data points of the point cloud data positioned within a corridor positioned above the ground plane. The method further includes projecting the identified data points onto a plane. The method further includes detecting the overhead obstruction based on a concentration of point cloud data positioned within a plurality of cells of the plane. The method further includes storing the detected overhead obstruction above the path segment within a map database.

20 Claims, 11 Drawing Sheets

(56) References Cited

U.S. PATENT DOCUMENTS

| | | | | |
|---|---|---|---|---|
| 2004/0183661 | A1* | 9/2004 | Bowman | G08G 1/165 |
| | | | | 340/435 |
| 2010/0121577 | A1* | 5/2010 | Zhang | G01S 17/931 |
| | | | | 701/301 |
| 2014/0218481 | A1* | 8/2014 | Hegemann | H04N 13/271 |
| | | | | 348/46 |
| 2014/0336935 | A1* | 11/2014 | Zhu | G01S 17/86 |
| | | | | 702/3 |
| 2014/0347470 | A1* | 11/2014 | Zhang | G06T 3/4038 |
| | | | | 348/118 |
| 2015/0338524 | A1 | 11/2015 | Ben Moshe | |
| 2016/0356594 | A1* | 12/2016 | Sorenson | G01S 17/10 |
| 2018/0361854 | A1* | 12/2018 | Chiba | G08G 1/163 |

FOREIGN PATENT DOCUMENTS

| | | |
|---|---|---|
| DE | 102015101268 A1 | 8/2016 |
| DE | 102015213701 A1 | 1/2017 |

OTHER PUBLICATIONS

El-Basyouny, K., A. Gadowski, and K. Froese. "Automated Inventory of Overhead Assets on Highways using Mobile LiDAR Data." TAC 2017: Investing in Transportation: Building Canada's Economy—2017 Conference and Exhibition of the Transportation Association of Canada. 2017.

Wang, Hanyun, et al. "Automatic road extraction from mobile laser scanning data." Computer Vision in Remote Sensing (CVRS), 2012 International Conference on. IEEE, 2012.

* cited by examiner

AUTOMATIC DETECTION OF OVERHEAD OBSTRUCTIONS

FIELD

The following disclosure relates to detecting an overhead obstruction along a path segment and storing the detected overhead obstruction within a map database.

BACKGROUND

Current autonomous driving techniques depend on accurate localization from global positioning system (GPS) measurements. Due to the presence of an overhead obstruction (e.g., a bridge, tunnel ceiling, or other permanent/static object) along a road, a vehicle's or navigation device's view of the sky may be blocked or obstructed.

Therefore, the detection and representation of an overhead obstruction is important to identify the areas along path segments were a vehicle or navigation device may be within a potentially GPS-denied environment.

SUMMARY

In one embodiment, a method for detecting an overhead obstruction includes receiving three-dimensional data collected by a depth sensing device traveling along a path segment, wherein the three-dimensional data comprises point cloud data positioned above a ground plane of the path segment. The method further includes identifying data points of the point cloud data positioned within a corridor positioned above the ground plane. The method further includes projecting the identified data points onto a plane. The method further includes detecting the overhead obstruction based on a concentration of point cloud data positioned within a plurality of cells of the plane. The method further includes storing the detected overhead obstruction above the path segment within a map database.

In one embodiment, an apparatus for detecting an overhead obstruction includes a processor configured to: receive three-dimensional data collected by a depth sensing device traveling along a path segment, wherein the three-dimensional data comprises point cloud data positioned above a ground plane of the path segment; identify data points of the point cloud data positioned within a corridor positioned above the ground plane; project the identified data points onto a plane; and detect the overhead obstruction based on a concentration of point cloud data positioned within a plurality of cells of the plane. The apparatus further includes a map database configured to store the detected overhead obstruction above the path segment within the map database.

In one embodiment, a non-transitory computer readable medium including instructions that when executed by a process are configured to receive three-dimensional data collected by a depth sensing device traveling along a path segment, wherein the three-dimensional data comprises point cloud data positioned above a ground plane of the path segment; identify data points of the point cloud data positioned within a corridor positioned above the ground plane; project the identified data points onto a plane; detect the overhead obstruction based on a concentration of point cloud data positioned within a plurality of cells of the plane; and store the detected overhead obstruction above the path segment within a map database.

BRIEF DESCRIPTION OF THE DRAWINGS

Exemplary embodiments of the present invention are described herein with reference to the following drawings.

DETAILED DESCRIPTION

Figure 1:
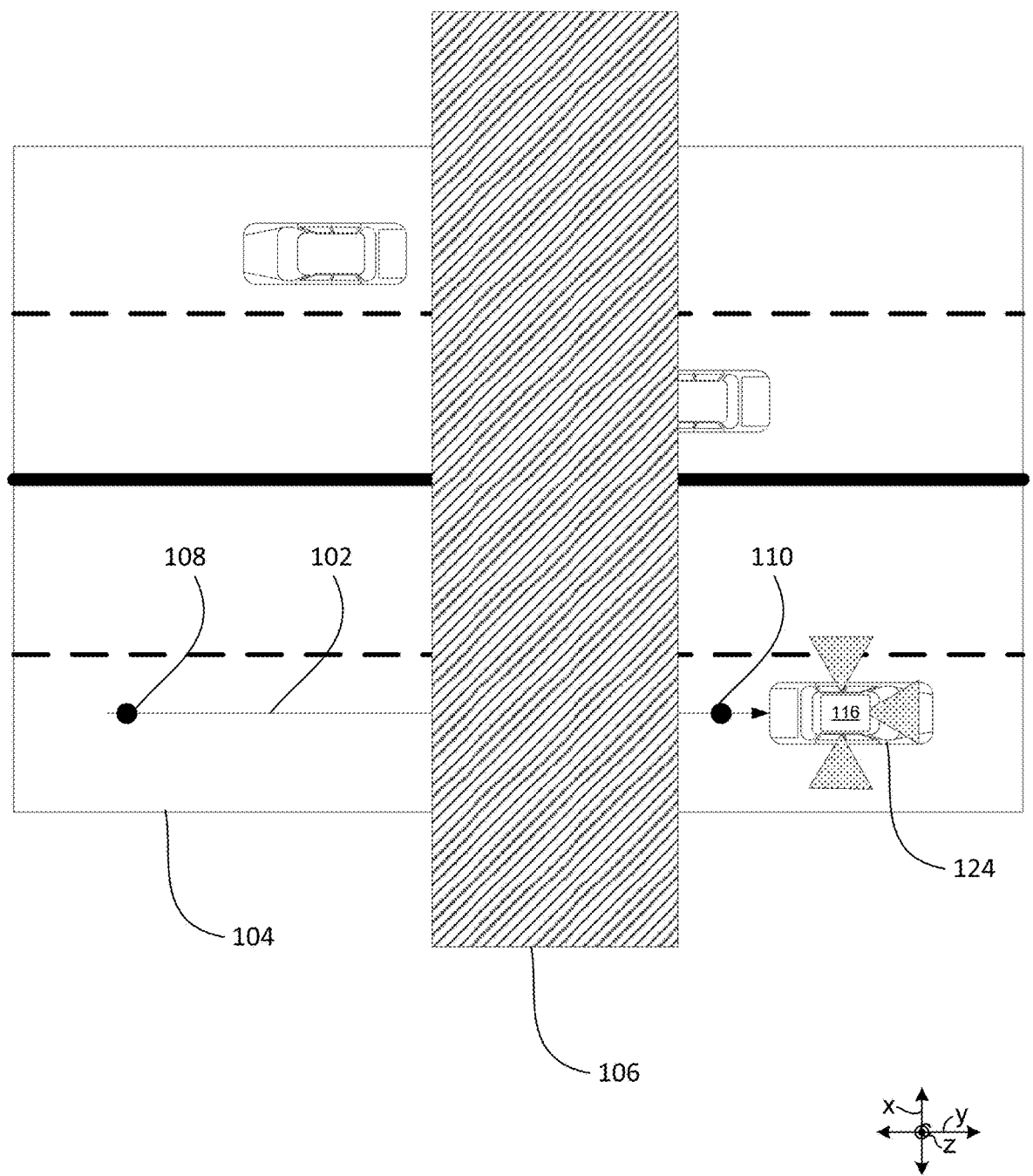
FIG. 1 illustrates an example of a road or pathway having an overhead obstruction.

Methods, devices, and systems for detecting an overhead obstruction for specific areas of a pathway are described herein. Detection of an overhead obstruction such as a bridge or tunnel ceiling along a road or pathway may be advantageous in proactively identifying problematic areas of a road or pathway with deficient views of the sky for global positioning or navigation of a vehicle (e.g., an autonomous vehicle).

Specifically, a map database may be developed with defined overhead obstructions for various path segments. This may be advantageous for one or more downstream uses by vehicles or navigation devices (such as an autonomous vehicle). For example, a vehicle or navigation device traveling along the pathway may be warned of an upcoming area with poor visibility of the sky or poor global positioning/localization. This may be particularly useful for an autonomous vehicle or a navigation device within an autonomous vehicle, wherein the autonomous vehicle may switch away from a global positioning system (GPS) navigation method as the vehicle approaches the overhead obstructed area (as identified in the map database).

In another example, an image capture device within the vehicle may falsely identify the overhead obstruction as an upcoming road or lane obstruction. This incorrect identification of a lane obstruction may be corrected (or ignored) based on the map database's identification of an overhead obstruction at the same location. Similarly, a vehicle may falsely identify an overhead obstruction as an approaching vehicle (i.e., another car or truck on the pathway). Through communication with the map database, the warning of an approaching vehicle may be delayed or cancelled based on the map database's identification of an overhead obstruction at the same location.

In another example, the map database's knowledge of an upcoming overhead obstruction may generate a warning to the vehicle traveling along the pathway. Specifically, the map database may store knowledge of the approximate height above the pathway or ground clearance of the overhead obstruction. A warning may be generated to the vehicle if the ground clearance is less than the height of the vehicle or near the same height of the vehicle (e.g., within 0.1-0.5 meters of the vehicle height). In some examples, the ground clearance height may be displayed on a display of the vehicle or the navigation device within the vehicle as the vehicle approaches the overhead obstruction along the pathway.

The methods, systems, and devices for detecting overhead obstructions on a path or road segment and developing a map database that identify the detected overhead obstructions are described in greater detail below.

I. Capturing Data Along a Road Segment

As used herein, a "path segment" or "road segment" may refer to any traveling lane or pathway that may be capable of being monitored, or may become capable of being monitored in the future (e.g., a highway, city street, bus route, train route, walking/biking pathway, waterway).

In certain embodiments, overhead obstructions may be detected along a road segment through the collection of three-dimensional (3D) data on selected road segments within a road network, as well as the collection of location data (e.g., GPS data) associated with the 3D data. The 3D data may be depth map or point cloud data acquired using 3D optical distancing systems or intensity-based scanning techniques captured above the road segment (e.g., above the vehicle as the vehicle travels along the road segment). In certain embodiments, depth map or point cloud data is collected using a depth sensing device. The depth sensing device may be any depth sensing stereoscopic or stereo-camera (e.g., a LIDAR camera), a radio detection and ranging (RADAR) device, an ultrasound device, or a structure light camera. The depth sensing device may comprise a moving mono-camera configured to identify three-dimensional structures from motion.

LIDAR, also known as LiDAR, Lidar, or other similar representations, may also be referred to as three-dimensional laser scanning or an optical distancing system, which employs one or more lasers or cameras to collect data points representing an area, such as an area about a road or walkway.

The LIDAR camera in a data acquisition system may use ultraviolet, visible, or near-infrared light to image objects, targeting a wide range of materials, such as non-metallic objects, rocks, rain, chemical compounds, aerosols, clouds, and even single molecules. A narrow laser-beam may map physical features with high resolution.

Software may generate a depth map or point cloud based on the measured distance, the locations of the optical distancing system, which may be on a moving platform such as a car, and the angle of the laser. Other optical distancing systems include a stereoscopic camera, a time of flight infrared camera, or a structured light device. A LIDAR camera collects and gathers data points in a point cloud in which each data point corresponds to a local coordinate, such as (x, y, z), and is either on or off. Alternatively, the LIDAR data may be a grayscale point cloud including an intensity (indicating reflectivity) for each data point, in a predetermined range of values (e.g., 0 to 255, 0 to 65536) with black at one end of the range and white at the other. The point cloud may be stored in ASCII or LIDAR exchange format (e.g., the American Society for Photogrammetry and Remote Sensing (ASPRS) .LAS file format). The one or more lasers may be in a near infrared spectrum (such as about 700 nm to about 5000 nm or about 800 nm to about 2500 nm) or other light spectrum.

In certain embodiments, the LIDAR camera may be attached or otherwise integrated with a data collection device (e.g., vehicle). There may also be a positioning system integrated with the LIDAR vehicular system such as a GPS to provide a base reference for the data acquired by the LIDAR system. The mobility of a vehicular system may facilitate acquiring data across a large geographic area using established positions for reference and integration of the acquired data into a point cloud representing the geographic area.

Examples of data collection devices or vehicles are described in greater detail below.

The collection of the 3D data via a depth sensing device or system (e.g., LIDAR camera) may be combined with the collection of location data via a geographic positioning system (GPS), for example, to provide a base reference for the 3D data acquired by the depth sensing device or system. Through the combination of the depth sensing data and the location data, the 3D data collected may be saved or encoded into the map database with attributed latitude, longitude, altitude, and elevation measurements.

FIG. 1 depicts an example of a vehicle 124 traveling along a pose path 102 on a road segment 104 that passes underneath an overhead obstruction 106 (e.g., a bridge). The vehicle 124 is equipped with a depth sensing device 116 configured to collect depth map or point cloud data. The vehicle is also equipped with additional sensors, described in greater detail below with reference to FIG. 7.

The depth sensing device 116 may be configured to gather point cloud data in any direction, including the direction perpendicular from the surface of the road (i.e., above the vehicle). Collecting depth map data from directly above the vehicle, perpendicular to the road surface (along the z-axis), as the vehicle travels along the pose path 102 may be advantageous in identifying static (non-moving) overhead obstructions while avoiding identification of certain dynamic (moving) overhead obstructions. For example, the collection of depth map data above the vehicle at an angle that is not perpendicular to the road surface may identify an obstruction such as a large truck that is positioned in front of the vehicle, behind the vehicle, or in an adjacent lane to the vehicle as the vehicle travels along the pose path 102. This obstruction is a dynamic obstruction that should not be stored in the map database. Therefore, it is important to collect and process depth map or point cloud data within an angle range that includes depth map data directly above the vehicle (e.g., perpendicular to the road surface) to avoid falsely identifying a dynamic overhead obstruction as a static overhead obstruction.

The data collection process may include the collection of both point cloud data and location data. The location data may be used to determine the traveling path or pose path 102 of the vehicle for a specific path segment, such as depicted in FIG. 1 and described in greater detail below. For example, the pose path 102 may be calculated by a processor associated with the collection device or associated with a separate device such as a map developer database in communication with the collection device. The processor may calculate the pose path 102 by identifying at least two data points 108, 110 having location data of the vehicle as the vehicle travels along the road or pathway. The at least two data points include a first (e.g., starting) point 108 and a second (e.g., ending) point 110. The pose path 102 may be interpolated or extrapolated from the location data (e.g., GPS data) associated with the first and second data points 108, 110. In certain examples, the first data point 108 and second data point 110 are within a certain maximum distance, to avoid incorrectly defining a straight path that is actually curved. For example, the distance between data points 108, 110 for determining the pose path may be a maximum of 5 meters, a maximum of 10 meters, a maximum of 12 meters, a maximum of 15 meters, a maximum of 20 meters, within a range of 5-20 meters, within a range of 10-15 meters, or within a range of 10-12 meters.

The location data may also be used to calculate or determine the ground plane on which the vehicle is traveling (discussed in greater detail below).

Figure 2:
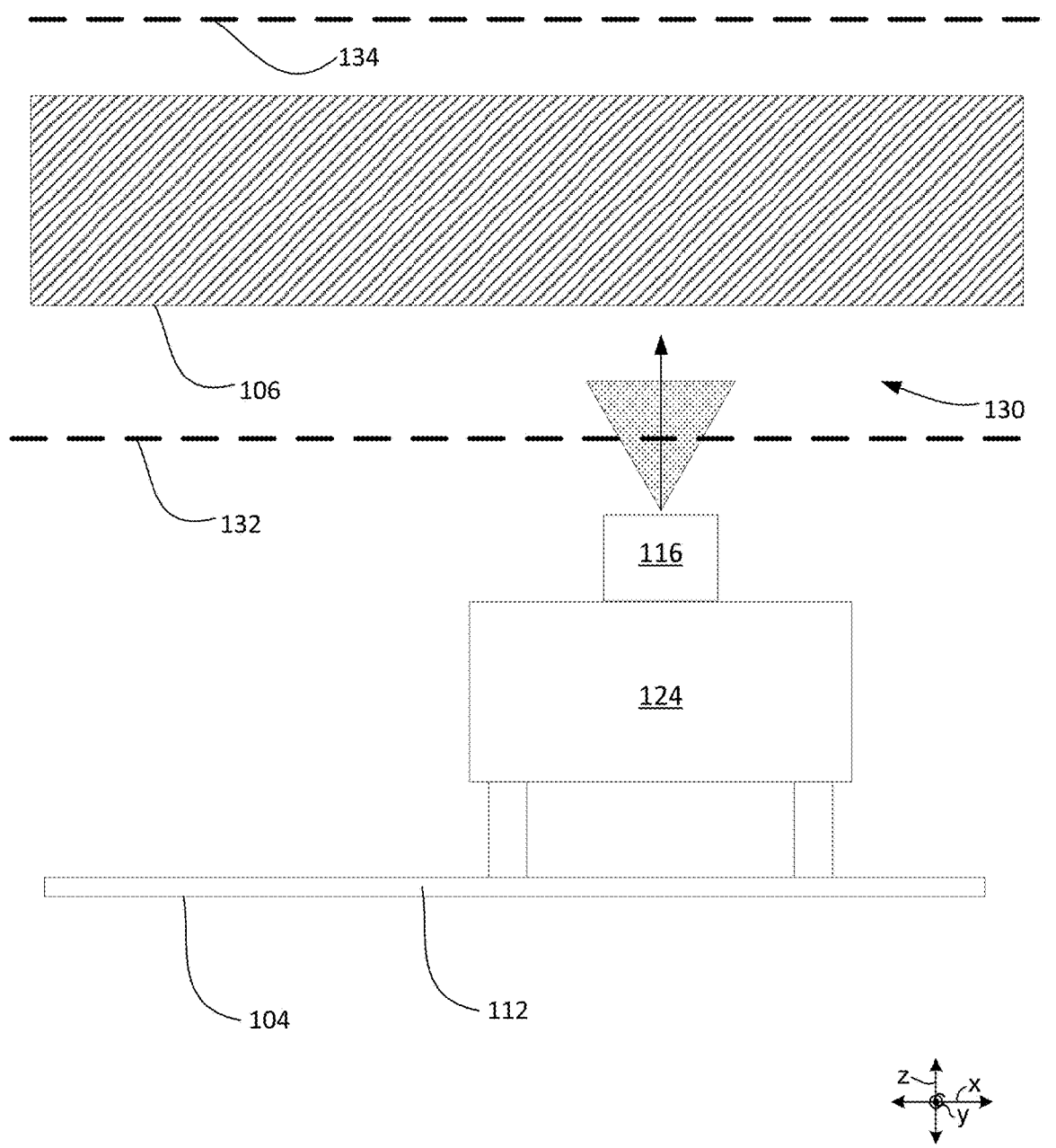
FIG. 2 illustrates an example of a cross-sectional view of a vehicle positioned on a ground plane, traveling underneath an overhead obstruction.

FIG. 2 depicts a cross-sectional view of a vehicle 124 and path segment 104, wherein the vehicle 124 is positioned on a ground plane 112 and is traveling underneath an overhead obstruction 106. The pose path (longitudinal direction) is positioned along the y-axis. The latitudinal direction of the road is positioned along the x-axis. The ground plane 112 of the road or path segment 104 is formed by the x and y axes.

As depicted in FIG. 2, the vehicle 124 includes a depth sensing device 116 (e.g., LIDAR camera) configured to collect depth map or point cloud data above the path segment. The depth sensing device 116 may be configured to collect point cloud data above the vehicle 124 to identify any overhead obstructions 106 positioned within a corridor 130 above the ground plane 112 (wherein the corridor is defined by a lower plane 132 and an upper plane 134, discussed in greater detail below). This process includes capturing point cloud data positioned along the z-axis, perpendicular to the ground plane 112, as the vehicle travels in the longitudinal direction (y-axis) along the pose path. Additional point cloud data may be collected for analysis within a predefined angle of the z-axis (e.g., if the z-axis represents 0 degrees, the depth sensing device 116 may be configured to collect point cloud data for analysis within a defined maximum angle range of the 0 degree vector). In certain examples, point cloud data may be collected within 5 degrees of the z-axis, 10 degrees, 15 degrees, 20 degrees, 25 degrees, 30 degrees, 35 degrees, 40 degrees, or 45 degrees of the z-axis.

Figure 3:
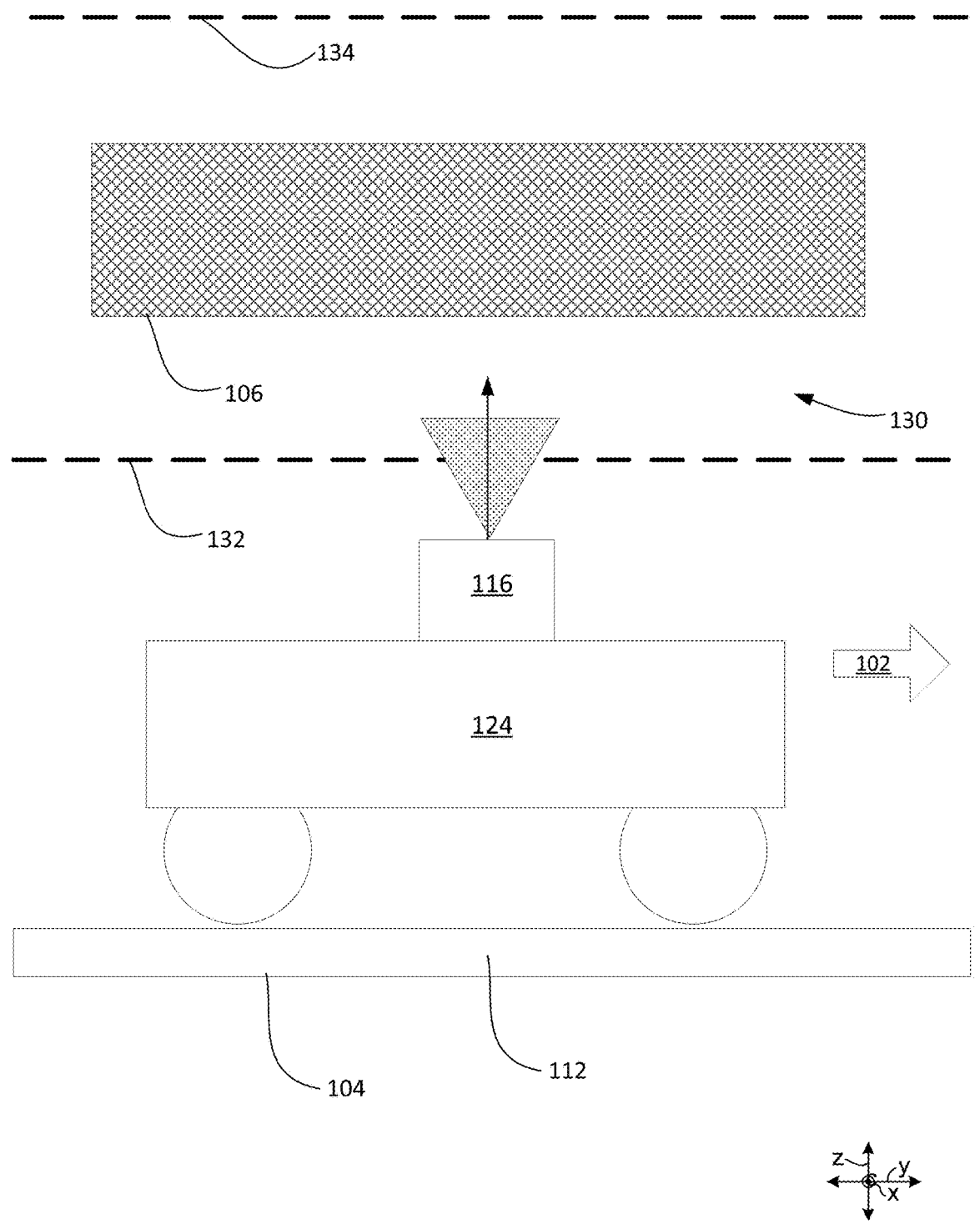
FIG. 3 illustrates an example of a side-view of vehicle positioned on a ground plane, traveling underneath an overhead obstruction.

FIG. 3 depicts an alternative side-view of the vehicle 124 from FIG. 2, wherein the vehicle 124 is positioned on a ground plane 112 and traveling underneath an overhead obstruction 106. The vehicle 124 is traveling in the longitudinal direction (y-axis) along the pose path 102. The latitudinal direction of the road is positioned along the x-axis. The ground plane 112 of the road or path segment 104 is formed by the x and y axes.

As depicted in FIG. 3, the vehicle 124 includes a depth sensing device 116 (e.g., LIDAR camera) configured to collect depth map or point cloud data above the path segment and, in particular, above the vehicle to identify any overhead obstructions (e.g., within a corridor 130 above the ground plane 112). As noted above, this process includes capturing point cloud data positioned along the z-axis, perpendicular to the ground plane. The process of capturing point cloud data above the vehicle 124 may be iteratively conducted as the vehicle 124 continues to travel along the pathway. For example, the process of capturing point cloud data by the depth sensing device 116 may be conducted when the vehicle has traveled a defined length along the pathway (e.g., every 0.1 meter, 0.5 meter, 1 meter, etc.) or after a defined period of time (e.g., every 100 milliseconds, every 1 second, every 5 seconds, or another interval).

II. Transmitting/Receiving the Data for Analysis

In certain embodiments, the data (e.g., point cloud data and/or location data) from one or more data collection vehicles may be transmitted or uploaded to a map developer database over a connected network for further analysis. In some embodiments, the transmitting or uploading process may be conducted after the data collection vehicle(s) have completed their collection of the depth map or point cloud data. In other embodiments, the uploading process may comprise transmitting data over a connected network to the map developer database as the data is collected.

Figure 4:
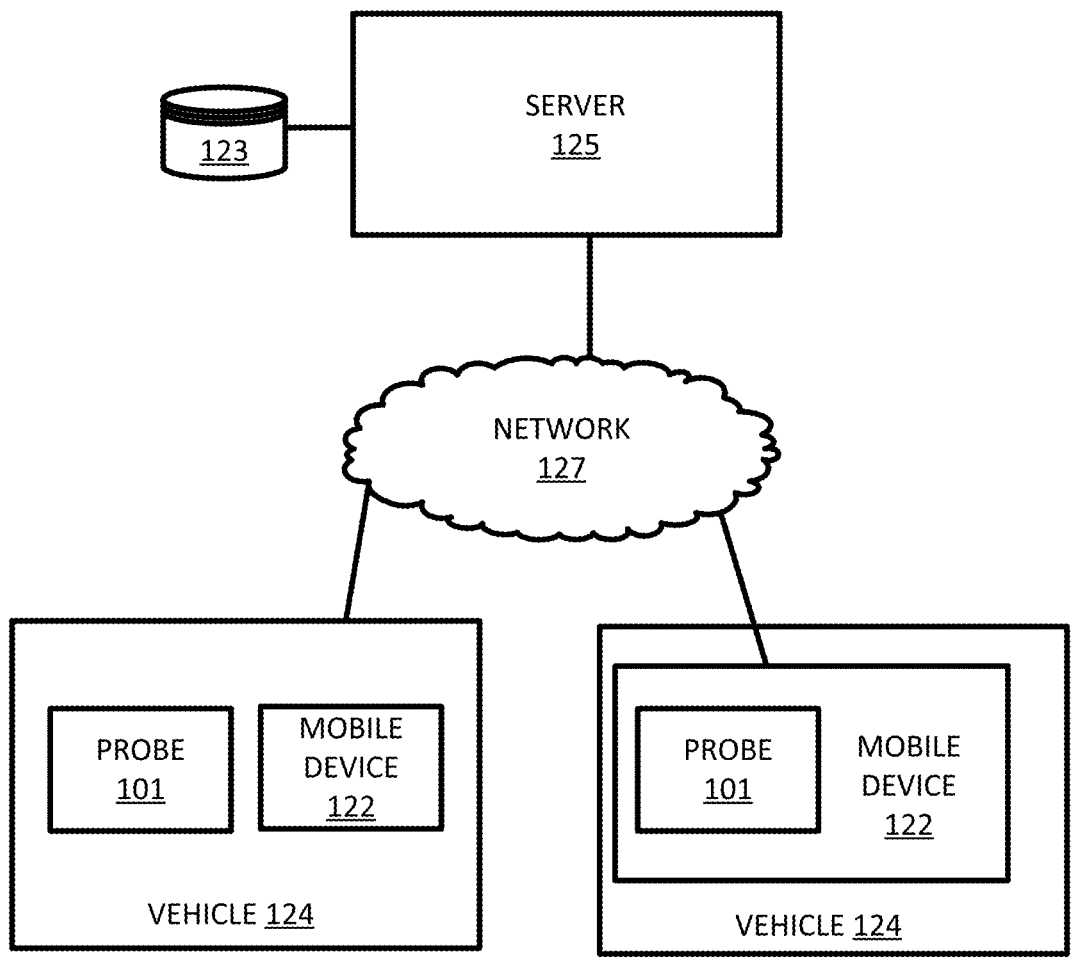
FIG. 4 illustrates an example system for detecting overhead obstructions and developing a map database.

FIG. 4 depicts an example system for communication between vehicles and the map developer database. In FIG. 4, one or more vehicles 124 are connected to a server 125 though the network 127. The vehicles 124 may be directly connected to the server 125 or through an associated mobile device 122 of the vehicle. A map developer system, including the server 125 and a geographic database 123, exchanges (e.g., receives and sends) data from the vehicles 124. The mobile devices 122 may include local databases corresponding to a local map, which may be modified according to the server 125. The local map may include a subset of the geographic database 123 and are updated or changed as the vehicles 124 travel. The mobile devices 122 may be stand-alone devices such as smartphones or devices integrated with vehicles. Additional, different, or fewer components may be included.

Each vehicle 124 and/or mobile device 122 may include position circuitry such as one or more processors or circuits for generating probe data. The probe data may be generated by receiving GNSS signals and comparing the GNSS signals to a clock to determine the absolute or relative position of the vehicle 124 and/or mobile device 122. The probe data may be generated by receiving radio signals or wireless signals (e.g., cellular signals, the family of protocols known as WiFi or IEEE 802.11, the family of protocols known as Bluetooth, or another protocol) and comparing the signals to a pre-stored pattern of signals (e.g., radio map). The mobile device 122 may act as probe 101 for determining the position or the mobile device 122 and the probe 101 may be separate devices.

The probe data may include a geographic location such as a longitude value and a latitude value. In addition, the probe data may include a height or altitude. The probe data may be collected over time and include timestamps. In some examples, the probe data is collected at a predetermined time interval (e.g., every second, every 100 milliseconds, or another interval). In some examples, the probe data is collected in response to movement by the probe 101 (i.e., the probe reports location information when the probe 101 moves a threshold distance). The predetermined time interval for generating the probe data may be specified by an application or by the user. The interval for providing the probe data from the mobile device 122 to the server 125 may be may the same or different than the interval for collecting the probe data. The interval may be specified by an application or by the user.

Communication between the vehicles 124 and/or between the mobile device 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, 5G, DSRC (dedicated short range communication), or another protocol.

III. Detecting Overhead Obstruction

Following receipt of the three-dimensional, point cloud data and the location (e.g., GPS) data by a map development database, a processor associated with the database may be configured to detect an overhead obstruction above the road or path segment through an analysis of the point cloud data and its associated location data.

The process of detecting the overhead obstruction includes determining the pose path of the vehicle that collected the point cloud data. The location data may be used to determine the traveling path or pose path of the vehicle for a specific path segment, such as described above with respect to FIG. 1. As noted above, in certain examples, a processor associated with the map development database may be used to determine the pose path of the collection vehicle.

Upon determination of the pose path, a ground plane of the path or road surface may be calculated. The ground plane of the path surface is determined using the longitudinal direction of the path segment and the latitudinal direction of the path segment. By presuming that the pose path is parallel with the path surface, the longitudinal direction of the path or road may be defined by the vector connecting the starting and ending points of the pose path. The latitudinal direction of the path may be defined by the vector cross product of the local z-direction [e.g., taken to be (0, 0, 1) in a Local Tangent Plane coordinate frame] and the longitudinal direction. The cross product of the longitudinal direction and the latitudinal direction may then define the normal of the ground plane of the path surface. Further, the lowest point under the midpoint of the pose path is presumed to be on the ground plane.

The processor may be configured to analyze point cloud data within a corridor or volume positioned above the ground plane for analysis of the point cloud data. The corridor defines an volume above the surface of a path or roadway between a lower limit and an upper limit that may contain an overhead obstruction that is potentially problematic for having a deficient view of the sky for global positioning or navigation of a vehicle.

The lower limit may be a lower plane positioned parallel with the ground plane, and the upper limit may be an upper plane positioned parallel with both the ground plane and the lower plane. In other words, the lower plane of the corridor defines a first height above the collection vehicle and the upper plane of the corridor defines a second height at which an obstruction is capable of creating a deficient view of the sky for localization or positioning of the vehicle. For example, an obstruction identified at 1000 meters directly above a vehicle may not be problematic for global positioning of the vehicle, while an obstruction at 10 meters directly above the vehicle may be problematic.

A user of the map developer database may set the lower and upper limits of the corridor, or the limits may be assigned a default or programmed setting by the processor. Therefore, in certain examples, the corridor may be defined by one or more vertical planes, including a lower plane positioned in a range of 2-10 meters above the ground plane, in a range of 3-5 meters above the ground plane, at 5 meters above the ground plane, at 4 meters above the ground plane, at 3 meters above the ground plane, or at 2 meters above the ground plane. The corridor may be defined by one or more vertical planes, including an upper plane positioned in a range of 10-100 meters above the ground plane, in a range of 15-50 meters above the ground plane, in a range of 20-30 meters above the ground plane, at 20 meters above the ground plane, at 25 meters above the ground plane, or at 30 meters above the ground plane. In addition or in the alternative, the corridor may be defined by one or more horizontal places, including a left horizontal plane and a right horizontal plane. The one or more horizontal planes may be defined according to a distance to the pose-path. Example distances may include 5, 10, or 20 meters in the lateral direction from the pose-path. In addition or in the alternative, the corridor may be defined by a depth plane spaced in the direction of travel of the path with respect to the collection of data.

Analysis of the point cloud data for detection of an overhead obstruction includes identification of point cloud data within the defined corridor. This identification may occur by process of elimination or by positive identification of point cloud data within the corridor. For example, analysis of the point cloud data within the corridor may involve removing or deleting all point cloud data collected outside of the defined corridor. In other words, point cloud data identified below the lower plane may be deleted or removed. Additionally, point cloud data identified above the upper plane may also be deleted or removed from further analysis. Upon deletion of the point cloud data outside of the defined corridor, the only point cloud data remaining for further analysis and processing is within the corridor.

Alternatively, the analysis of the point cloud data may include selection or positive identification of point cloud data within the corridor (without removal or deletion of data outside of the defined corridor).

Following identification of point cloud data within the corridor, the identified data may be projected onto a two-dimensional plane. Projecting the point cloud data onto a two-dimensional plane may be advantageous in normalizing or removing one variable in the analysis (i.e., the z-height data within the point cloud data). The longitudinal (y-axis) and latitudinal (x-axis) location data may be retained within the 2D plane. In other words, certain location data associated with the point cloud data may be included in the 2D plane. Alternatively, or additionally, the identified point cloud data may be matched with location data collected by the collection device and associated with the depth sensing device of the collection device.

In certain examples, the two-dimensional plane into which the point cloud data is projected is a plane that is parallel with the ground plane, lower plane, and upper plane. For instance, the two-dimensional plane may be the same plane as the lower or upper plane of the corridor. In other examples, the two-dimensional plane is a plane that is parallel with, but separate from the ground plane, lower plane, and upper plane. In certain examples, the two-dimensional plane is the ground plane.

In some examples, the identified point cloud data within the corridor may be analyzed to determine if a potential obstruction within the corridor may be ignored from further processing. Specifically, the point cloud data may be analyzed to determine if the potential obstruction is a tree or foliage that is positioned over the road segment. While a tree or foliage may technically be somewhat static or non-moving, such a structure will be defined as being "non-static" or moving within this disclosure. As such, the processor may be configured to analyze the point cloud data to differentiate between static and non-static structures. This analysis may include a comparison between point cloud data points within the corridor. Specifically, the analysis includes a comparison of the z-heights associated with the point cloud data. It is presumed that a static structure will have a similar z-height, or the z-height of the static structure will follow a linear or curved shape. Conversely, it is presumed that each point cloud data point for a tree or foliage overhanging a road or path segment will not be positioned at a same z-height, nor will the point cloud data follow a linear or curved trend between adjacent data points. Instead, it is presumed that the "non-static" tree or foliage structure will have a more sporadic pattern in the z-height data. As such, the processor may analyze the z-heights of the point cloud data to differentiate between static and non-static structures. In certain examples, the analysis between static and non-static structures is conducted prior to projecting the point cloud data onto the 2D plane. Therefore, in such an example, only identified static structures are projected onto the 2D plane. In alternative examples, the analysis may be conducted at any point following the collection of the point cloud data by the data collection vehicle. Therefore, in such an example, non-static structures could be projected onto the 2D plane only to be eliminated at a later stage before development of the map database with a detected overhead obstruction. Alternatively, these non-static structures may be flagged according to the static/non-static determination to be labeled as unoccupied, described below.

Following the projection of the point cloud data onto the 2D plane, the 2D plane may be divided into a plurality of cells for analysis. The division of cells may be defined between linear segments extending in the latitudinal direction perpendicular to the pose path or longitudinal direction. In certain examples, the linear segments are spaced an equidistance apart from each other, therein creating a plurality of cells with each cell having a same area as each additional cell. Alternatively, the linear segments may be spaced apart in random or non-equal distances from adjacent linear segments, therein forming non-equal area cells. The distance between adjacent linear segments (as measured in the longitudinal direction) is configurable. In certain examples, the distance may be in a range of 0.01-10 meters, 0.1-5 meters, 0.1-2 meters, 0.1-1 meter, or 0.5-1 meter.

Figure 5A:
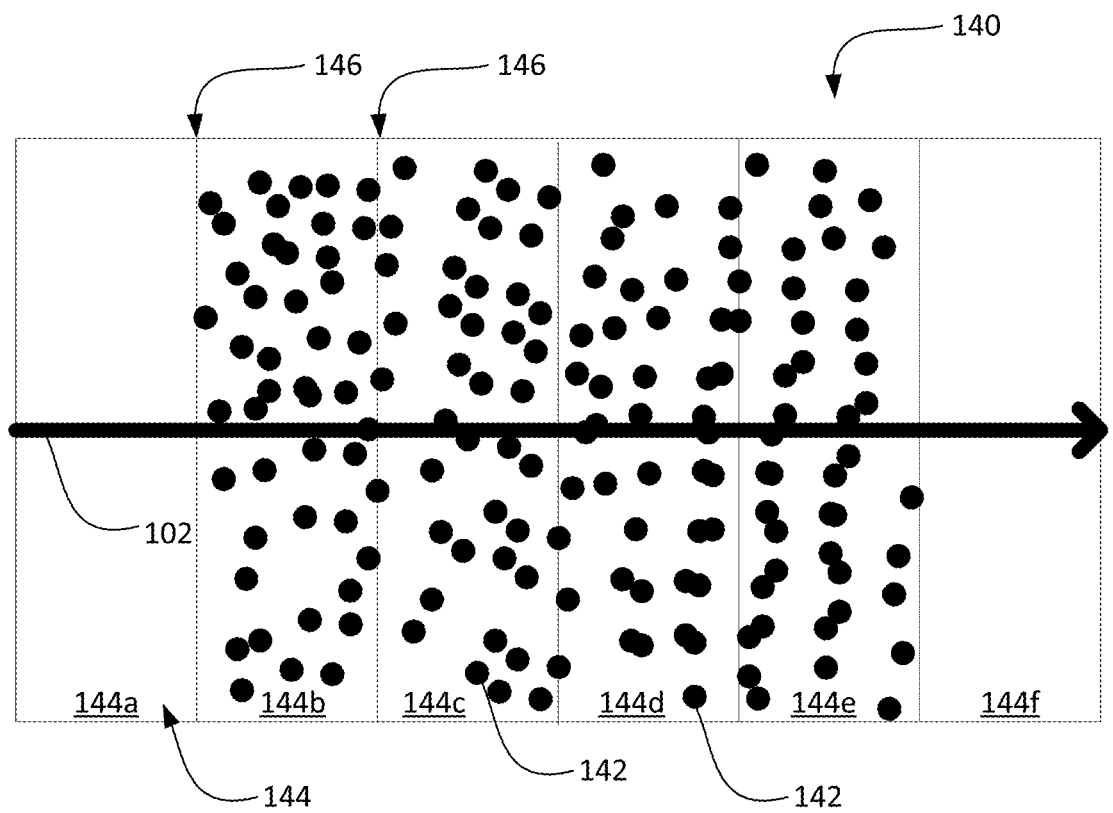
FIG. 5A illustrates exemplary point cloud data projected onto a two-dimensional plane.

FIG. 5A depicts an example of a 2D plane 140 with projected point cloud data. Each data point 142 is represented by a circular dot within the plane 140. A plurality of cells 144 (6 cells) are defined within the plane 140 by the linear segments 146 running perpendicular to the pose path 102. In this example, the first and sixth cells 144*a*, 144*f* do not contain any point cloud data, while the middle four cells 144*b*, 144*c*, 144*d*, 144*e* each contain a number of individual data points 142.

Following projection of the point cloud data into the 2D plane with a plurality of cells, the projected data may be analyzed to determine if an overhead obstruction is present. This may be conducted by analyzing each individual cell 144*a*-144*f* to determine whether each cell 144*a*-144*f* contains an obstruction or not. For example, the number of projected data points may be counted for each individual cell (i.e., the concentration of projected data points within the cell may be analyzed). If the number or concentration of projected data points equals or exceeds a predefined threshold number, the individual cell is marked as being 'Occupied.' If the number or concentration of projected data points is less than the predefined threshold number, the individual cell is marked as being 'Not Occupied.' In addition, any cells including only non-static structures may be labeled as 'Not Occupied' according to the static/non-static determination above.

Based on this analysis of the individual cells, a one-dimensional linear segment may be created that depicts the occupied and non-occupied statuses of the individual cells.

Figure 5B:
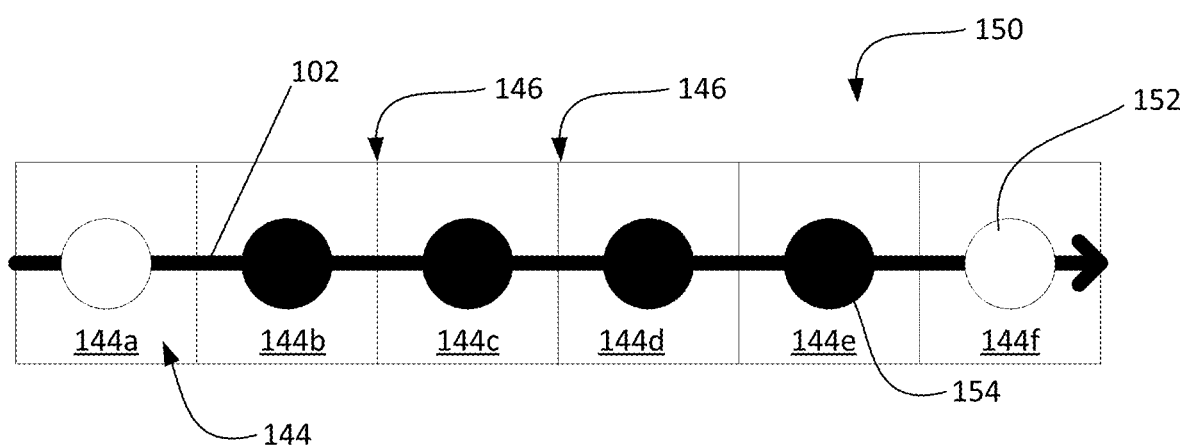
FIG. 5B illustrates an example of a conversion of the projected point cloud data from FIG. 5A into a set of one-dimensional cells.

FIG. 5B depicts an example of a one-dimensional linear segment 150 based on such an analysis of individual cells for the point cloud data for the six individual cells 144*a*-144*f* represented in FIG. 5A. In this analysis, the first and sixth cells 144*a*, 144*f* are identified as being 'Not Occupied' (as represented by an open circle 152), while the middle four cells are identified and marked as being 'Occupied' (as represented by a filled circle 154).

The overhead obstruction may be detected based on an analysis of the one-dimensional structure. For example, if a number of consecutive individual cells in the one-dimensional structure equal or exceed a predefined threshold, the processor may identify or detect that the specific section of the path or roadway includes an overhead obstruction. This predefined threshold may be based on a specific minimum length of an obstruction. If the gap between two adjacent clusters of 1D cells is less than a minimum threshold (e.g., 1 meter), the two clusters may be merged, and the processor determines the merged set of 1D cells as a single overhead obstruction. In addition, if a consecutive number of occupied cells equals a longitudinal distance of only 1 meter, the potential obstruction may not need to be included in a map database, as it is unlikely that such a small obstruction would impact visibility of the sky and cause a deficiency in localization of a navigation device traveling along a road or pathway. Therefore, in certain examples, the number of consecutive individual cells may need to equal a longitudinal distance of at least 5 meters in length, at least 10 meters, at least 15 meters, or at least 20 meters before the processor will 'detect' an overhead obstruction for potential inclusion in a map database.

IV. Storing the Detected Overhead Obstruction in a Map Database

Following the analysis and detection of an overhead obstruction for a specific road or path segment, the process may be repeated for additional road segments within a road or path network of a geographic area.

In certain embodiments, one or more detected overhead obstructions may be stored, linked, indexed, and/or associated with or in a map database, which is in communication with the processor. This may include storing the geographic location of each overhead obstruction, the longitudinal distance or length of the obstruction, and the height (e.g., above the ground plane) of the obstruction.

Alternatively, one or more detected overhead obstructions may be stored in one or more separate or different databases that may or may not be associated with the map database or data thereof. In certain examples, the map database or additional databases may be updated or revised based on updated receipt and analysis of new depth map data for one or more path segments within the road network.

In one embodiment, the map database includes data used for navigation-related and/or geographic-related services. For example, the map database contains road segment/link and node data records that represent a road network, such as the path network. A node represents an end point of a road segment and/or intersection points. The road segments and nodes may be associated with attributes, such as geographic coordinates, street names, address ranges, speed limits, turn restrictions at intersections, and other vehicle navigation attributes, as well as POIs, such as gasoline stations, hotels, restaurants, museums, stadiums, offices, automobile dealerships, auto repair shops, buildings, stores, etc. Alternatively, the map database contains path segment/link and node data records or other data that represent pedestrian paths in addition to or instead of the vehicle road record data.

The map database may be a master geographic database that is stored in a format that facilitates updating, maintenance, and development. For example, the master geographic database or data in the master geographic database is in an Oracle spatial format, such as for development or production purposes. The Oracle spatial format or development/production database may be compiled into a delivery format, such as a GDF format.

The data in the production and/or delivery formats may be compiled or further compiled to form geographic database products or databases, which may be used in end user navigation devices or systems or other systems or devices. For example, a customer of the map developer (such as a developer of navigation devices or systems) may receive generated multi-layered graphics images as well as other geographic data in a delivery format and then compile and/or configure such data for end user devices. In one embodiment, geographic data is compiled (such as into a PSF format) to organize and/or configure the data (e.g., segment/link, node, multi-layered graphics image, and/or other data or attributes) for performing navigation-related functions and/or services such as route calculation, route guidance, map display, speed calculation, distance and travel time functions, and other functions, by a navigation device. The navigation-related functions may correspond to vehicle navigation, pedestrian navigation, or other types of navigation.

V. Downstream Uses of Map Database with Overhead Obstructions

Following creation of a map database with the overhead obstruction, the database may be provided to a navigation device for use. The map database may be downloaded and stored within the end-user navigation device or the database may be in communication with the navigation device over a connected network. As noted above, use of the map database by the navigation device may be advantageous for one or more reasons. For example, a vehicle or navigation device (such as an autonomous vehicle) traveling along the pathway may be warned of an upcoming area with poor visibility of the sky or poor global positioning/localization. This may be particularly useful for an autonomous vehicle or a navigation device within an autonomous vehicle, wherein the autonomous vehicle may switch away from a global positioning system (GPS) navigation method as the vehicle approaches the overhead obstructed area (as identified in the map database).

In another example, an image capture device within the vehicle may falsely identify the overhead obstruction as an upcoming road closure or lane obstruction. This incorrect identification of a lane obstruction may be corrected (or ignored) because the map database includes an overhead obstruction at the same location. Similarly, a vehicle may falsely identify an overhead obstruction as an approaching vehicle (i.e., another car or truck on the pathway). Through communication with the map database, the warning of an approaching vehicle may be delayed or cancelled based on the map database's identification of an overhead obstruction at the same location.

In another example, the map database's knowledge of an upcoming overhead obstruction may generate a warning to the vehicle traveling along the pathway. Specifically, the map database may store knowledge of the approximate height above the pathway or ground clearance of the overhead obstruction. A warning may be generated to the vehicle if the ground clearance is less than the height of the vehicle or near the same height of the vehicle (e.g., within 0.1-0.5 meters of the vehicle height). In some examples, the ground clearance height may be displayed on a display of the vehicle or the navigation device within the vehicle as the vehicle approaches the overhead obstruction along the pathway.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle.

VI. Flowchart Examples

Figure 6:
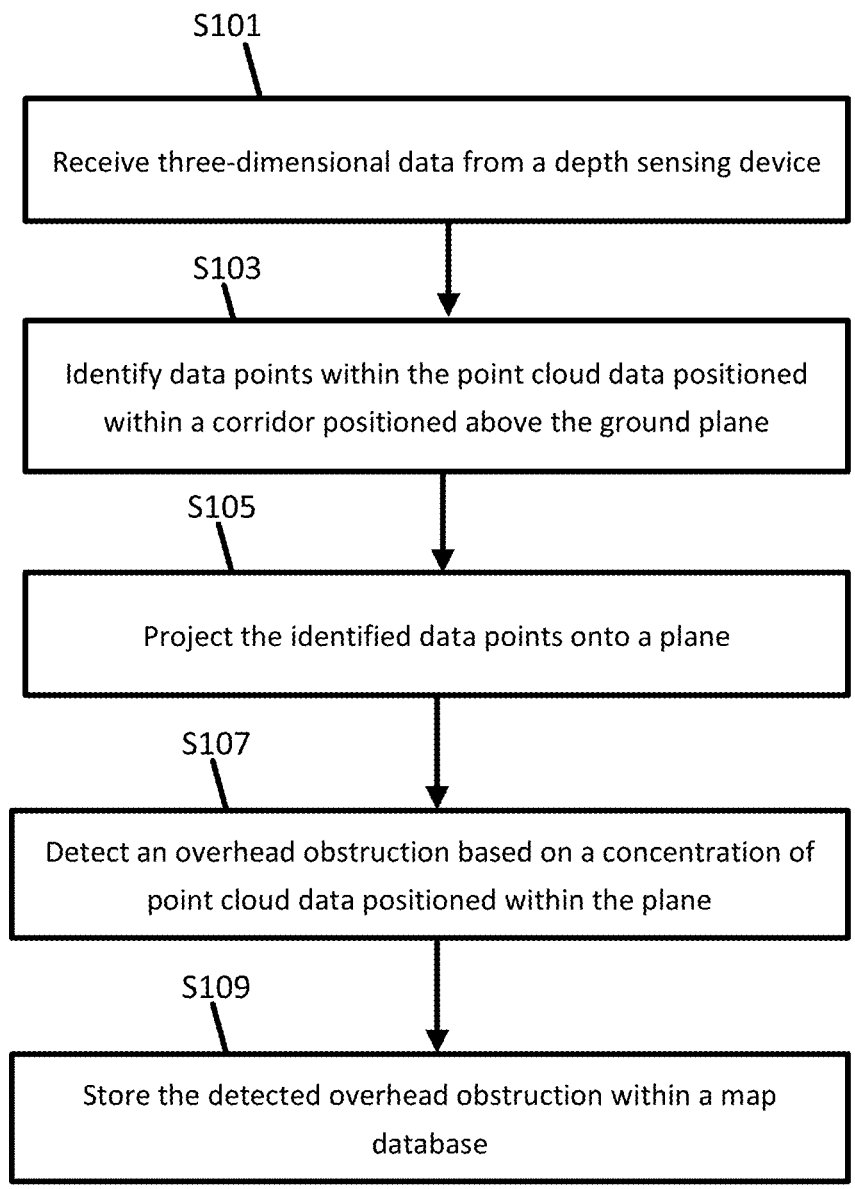
FIG. 6 illustrates a flow chart for detecting overhead obstructions.

FIG. 6 illustrates an example flowchart for detecting an overhead obstruction from three-dimensional data and developing a map database with the detected overhead obstruction. The process of the flowchart may be performed by a server 125 and processor 300, which may be referred to alternatively as the controller in the following description. Alternatively, another device may be configured to perform one or more of the following acts (such as the processor 200 of the mobile device 122). Additional, fewer, or different acts may be included.

At act S101, the processor 200 or the processor 300 receives three-dimensional data collected from a depth sensing device. The depth sensing device may be a LIDAR camera or system. The 3D data includes point cloud data positioned above a ground plane of the path segment. In certain examples, the point cloud data is collected from directly above a collection vehicle (and depth sensing device) traveling along the path segment, perpendicular to the surface or ground plane of the path segment. The 3D data may be received along with location or trajectory data of the collection vehicle.

At act S103, the processor 200 or the processor 300 identifies data points of the point cloud data positioned within a corridor positioned above the ground plane. The ground plane may be defined by determining a trajectory or pose path of the collection vehicle or device, as described in greater detail above. The corridor defines a volume above the surface of a path or roadway between a lower plane positioned parallel with the ground plane, and the upper plane positioned parallel with both the ground plane and the lower plane. The identification of data points within the defined corridor may occur by process of elimination or by positive identification of point cloud data within the corridor. For example, analysis of the point cloud data within the corridor may involve removing or deleting all point cloud data collected outside of the defined corridor. Alternatively, the analysis of the point cloud data may include selection or positive identification of point cloud data within the corridor (without removal or deletion of data outside of the defined corridor).

At act S105, the processor 200 or the processor 300 projects the identified data points onto a plane. In certain examples, the plane is the ground plane. The longitudinal (y-axis) and latitudinal (x-axis) location data of the identified data points may be retained within the 2D plane, while the height (z-axis) data is removed. In certain examples, the identified point cloud data within the corridor may be analyzed (e.g., prior to projection onto the plane) to determine if a potential obstruction is a "non-static" obstruction (e.g., a tree or foliage) that should not be stored within a map database.

At act S107, the processor 200 or the processor 300 detects the overhead obstruction based on a concentration of point cloud data positioned within a plurality of cells of the plane. This may be conducted by analyzing each individual cell of a plurality of cells within the plane to determine whether each cell contains an obstruction or not. A cell may be identified as being 'Occupied' when the number or concentration of projected data points within the cell equals or exceeds a predefined threshold number. A cell may be identified as being 'Not Occupied' if the number or concentration of projected data points within the cell is less than the predefined threshold number. Based on this analysis of the individual cells, a one-dimensional linear segment may be created that depicts the occupied and non-occupied statuses of the individual cells. The overhead obstruction may be detected when a number of consecutive individual cells in the one-dimensional structure are identified as being occupied.

At act S109, the processor 200 or the processor 300 stores the detected overhead obstructions above the path segment within a map database. In certain embodiments, one or more detected overhead obstructions may be stored, linked, indexed, and/or associated with or in a map database, which is in communication with the processor. This may include storing the geographic location of each overhead obstruction, the longitudinal distance or length of the obstruction, and the height (e.g., above the ground plane) of the obstruction.

VIII. Devices and Systems

Figure 7:
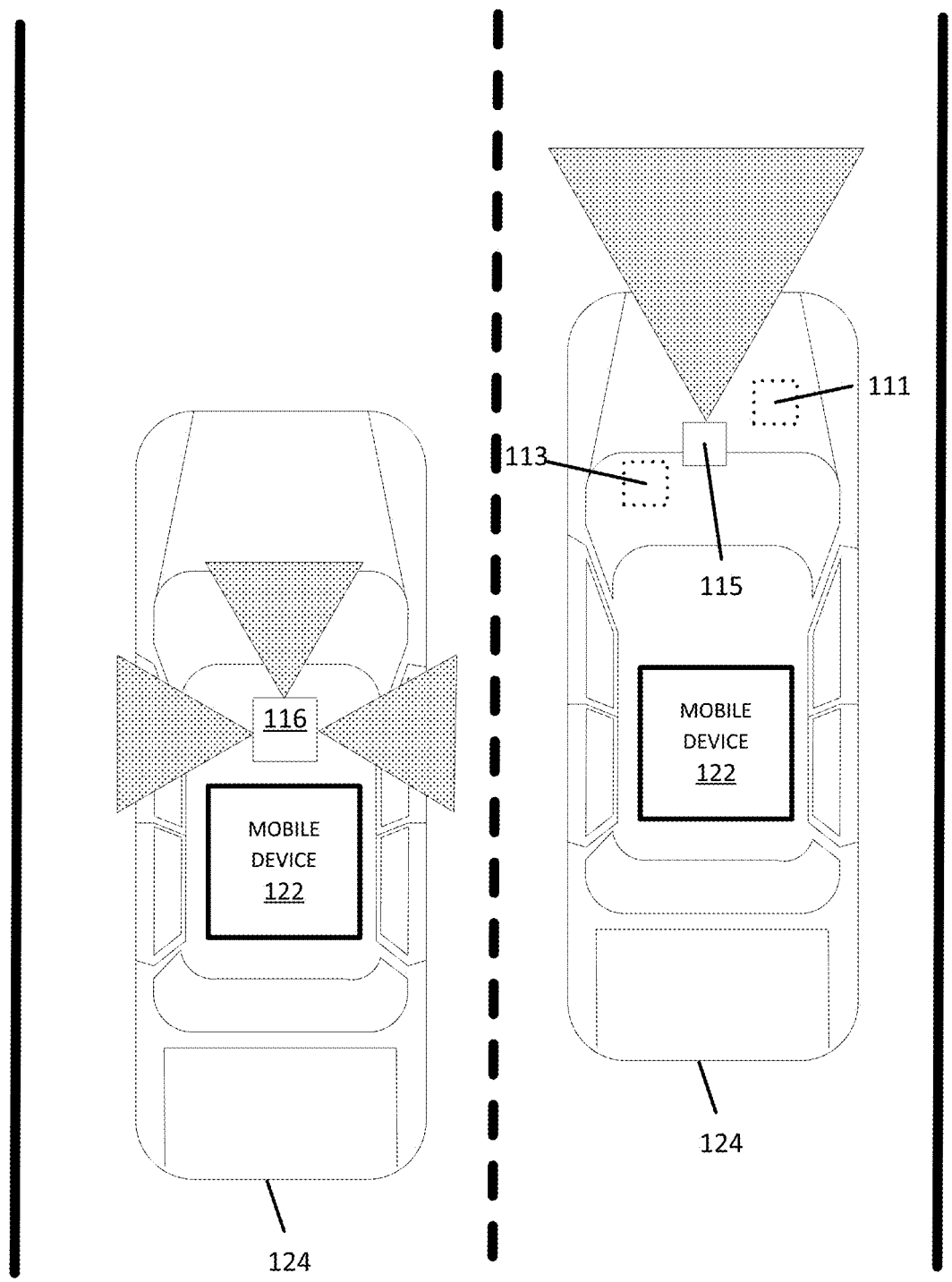
FIG. 7 illustrates an exemplary vehicle having a depth sensing device.

FIG. 7 illustrates exemplary vehicles 124 for collecting 3D data (e.g., depth map or point cloud data) and location data (e.g., GPS data) along a path segment. The vehicle 124 may include a variety of devices that generate trajectory data. The trajectory data may be generated by a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively, or additionally, the one or more detectors or sensors may include an accelerometer built or embedded into or within the interior of the vehicle 124.

The vehicle 124 may include one or more distance data detection devices or sensor, such as a light detection and ranging (LiDAR) device. The distance data detection sensor may generate point cloud data. The distance data detection sensor may include a laser range finder that rotates a mirror directing a laser to the surroundings or vicinity of the collection vehicle on a roadway or another collection device on any type of pathway. The distance data detection device may generate the trajectory data. Other types of pathways may be substituted for the roadway in any embodiment described herein.

The vehicle 124 may include a communication device and an environment sensor array for reporting the surroundings of the vehicle 124 to a server. The vehicle 124 may include an integrated communication device coupled with an in-dash navigation system. The vehicle may include an ad-hoc communication device such as a mobile device 122 or smartphone in communication with a vehicle system. The communication device 122 connects the vehicle to a network including at least one server. The network may be the Internet or connected to the internet.

The sensor array may include one or more sensors configured to detect surroundings of the vehicle 124. The sensor array may include multiple sensors. Example sensors include an optical distance system such as LiDAR 116, an image capture system 115 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera.

In some alternatives, additional sensors may be included in the vehicle 124. An engine sensor 111 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 113, may include a steering wheel angle sensor, a speedometer sensor, or a tachometer sensor.

Figure 8:
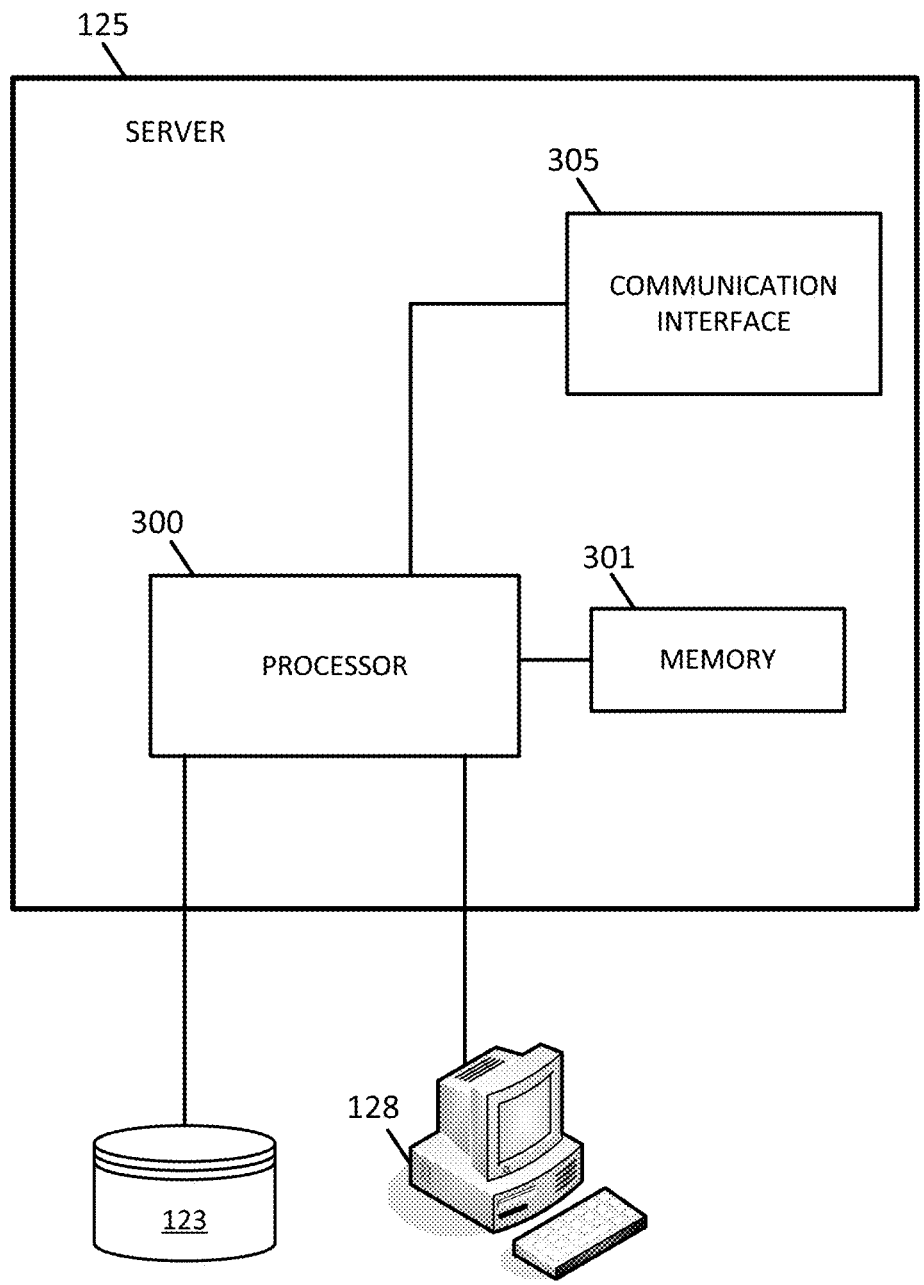
FIG. 8 illustrates an example server.

FIG. 8 illustrates an example server 125, which may apply to the system of FIG. 7. The server 125 includes a processor 300, a communication interface 305, a memory 301, and a database 123. The processor 300 may implement the functions associated with detecting an overhead obstruction, as discussed above. The communication interface 305 may facilitate the receipt of the probe data from the probes 101. An input device (e.g., keyboard or personal computer 128) may be used to enter settings to the server 125. The settings may include settings for thresholds and other user preferences described herein. The settings may include the corridor boundaries, cell widths, threshold limits for determining whether a cell is occupied or not occupied, or threshold distances for identifying whether a series of consecutive occupied cells represents an overhead obstruction. Additional, different, or fewer components may be provided in the server 125.

Figure 9:
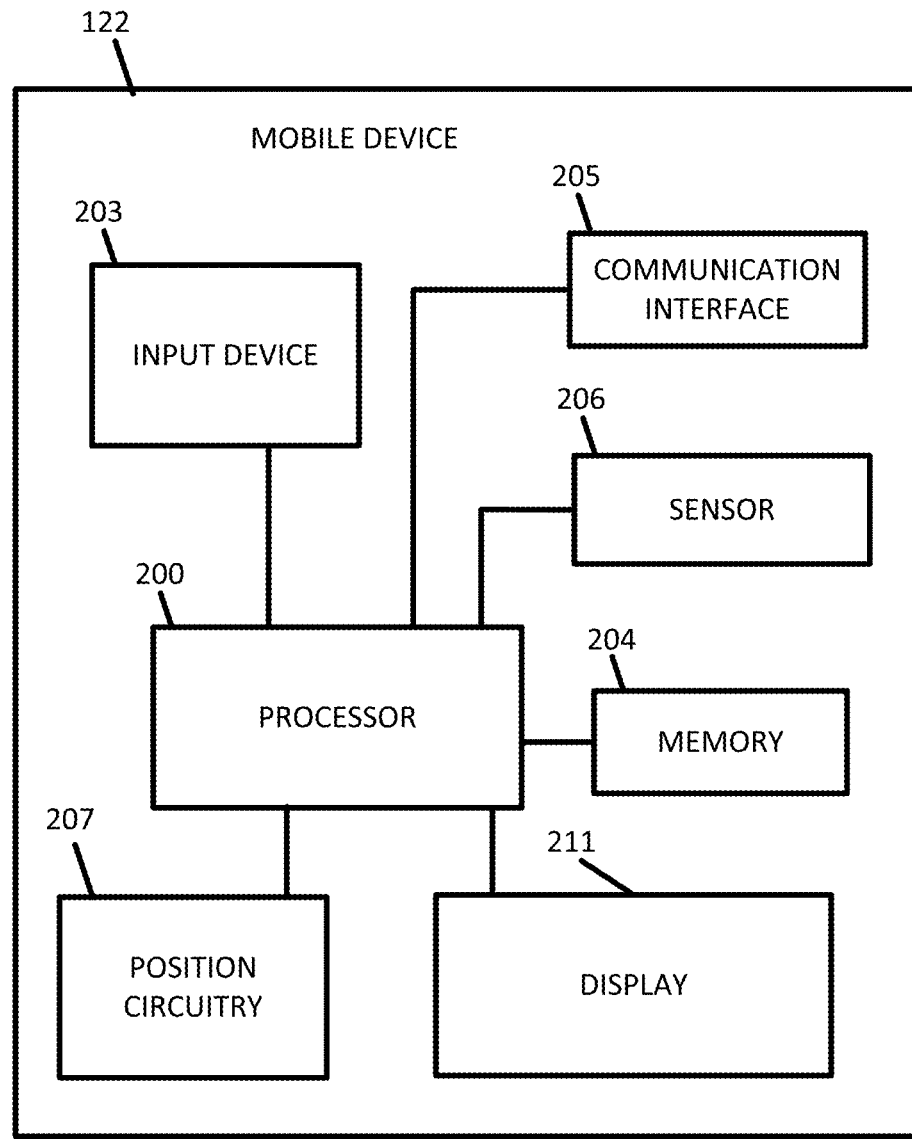
FIG. 9 illustrates an example mobile device.

FIG. 9 illustrates an exemplary mobile device 122 of the system of FIG. 7. The mobile device 122 includes a processor 200, a memory 204, an input device 203, a communication interface 205, position circuitry 207, a display 211, and a sensor 206. The input device 203 may receive commands from the user for default settings for defining the corridor boundaries or depth map data collection parameters.

The processor 200 may communicate with a vehicle ECU which operates one or more driving mechanisms (e.g., accelerator, brakes, steering device). Alternatively, the mobile device 122 may be the vehicle ECU, which operates the one or more driving mechanisms directly. The sensor 206 may include a camera, a LiDAR device, or another sensor described herein. The sensor 206 may detect congestion local to the mobile device 122. The sensor 206 may detect when an intersection is approaching. Additional, different, or fewer components are possible for the mobile device 122.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

The geographic database 123 may include map data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the map data. The map data may include structured cartographic data or pedestrian routes. The map data may include map features that describe the attributes of the roads and intersections. The map features may include geometric features, restrictions for traveling the roads or intersections, roadway features, or other characteristics of the map that affects how vehicles 124 or mobile device 122 flow through a geographic area. The geometric features may include curvature, slope, or other features. The curvature of a road segment describes a radius of a circle that in part would have the same path as the road segment. The slope of a road segment describes the difference between the starting elevation and ending elevation of the road segment. The slope of the road segment may be described as the rise over the run or as an angle. The geographic database 123 may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

Figure 10:
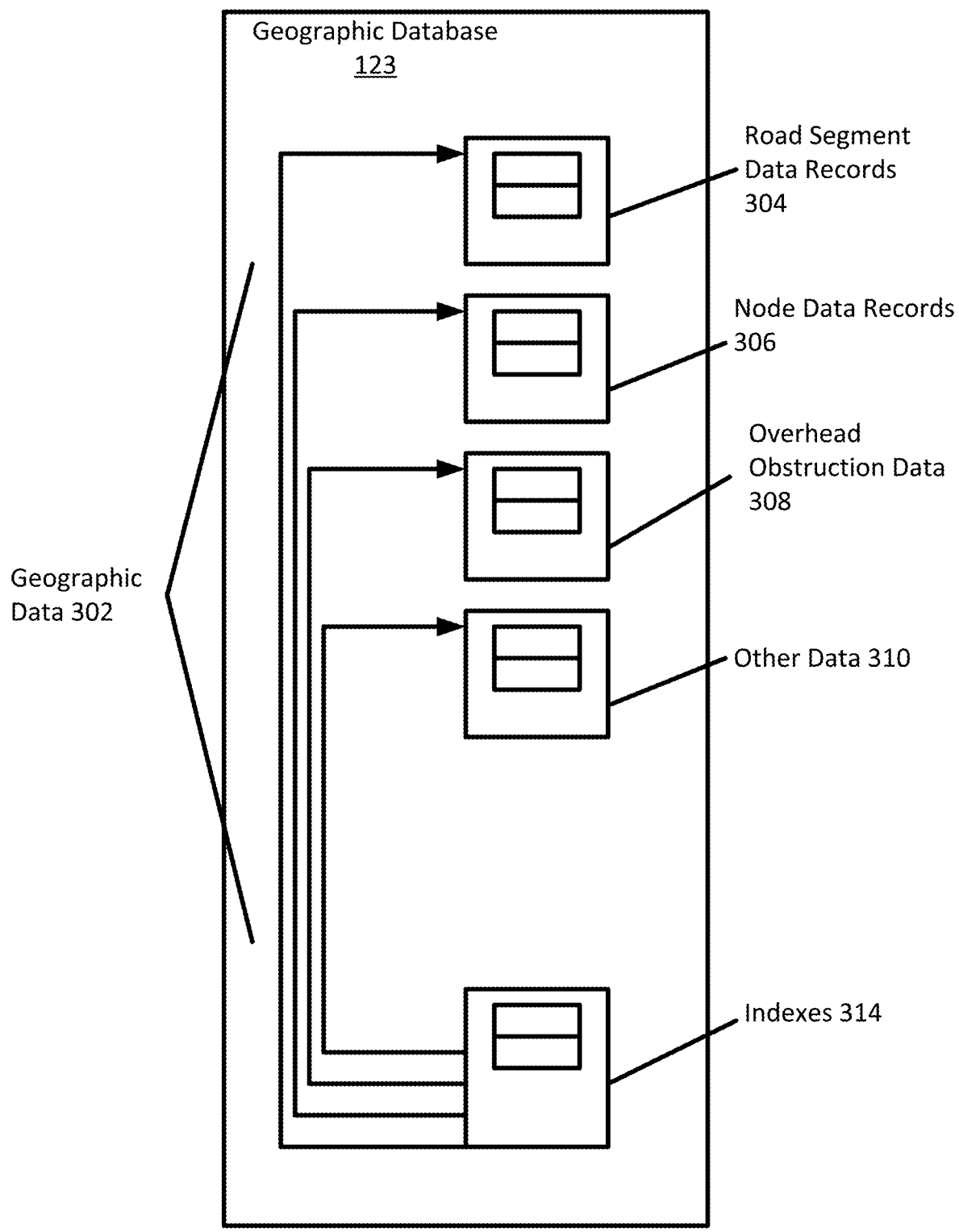
FIGS. 10 and 11 illustrate example geographic databases.

In FIG. 10, the geographic database 123 may contain at least one road segment database record 304 (also referred to as "entity" or "entry") for each road segment in a particular geographic region. The geographic database 123 may also include a node database record 306 (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include location fingerprint data for specific locations in a particular geographic region.

The geographic database 123 may include other kinds of data 310. The other kinds of data 310 may represent other kinds of geographic features or anything else. The other kinds of data may include POI data. For example, the POI data may include POI records comprising a type (e.g., the type of POI, such as restaurant, hotel, city hall, police station, historical marker, ATM, golf course, etc.), location of the POI, a phone number, hours of operation, etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

As another example, the indexes 314 may relate overhead obstruction data 308 with a road segment in the segment data records 304 or a geographic coordinate. An index 314 may, for example, store overhead obstruction data 308 relating to one or more road segments using the embodiments described herein.

The geographic database 123 may also include other attributes of or about roads such as, for example, geographic coordinates, physical geographic features (e.g., lakes, rivers, railroads, municipalities, etc.) street names, address ranges, speed limits, turn restrictions at intersections, and/or other navigation related attributes (e.g., one or more of the road segments is part of a highway or toll way, the location of stop signs and/or stoplights along the road segments), as well as POIs, such as gasoline stations, hotels, restaurants, museums, stadiums, offices, automobile dealerships, auto repair shops, buildings, stores, parks, municipal facilities, other businesses, etc. The geographic database 123 may also contain one or more node data record(s) 306 which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data 302 may additionally or alternatively include other data records such as, for example, POI data records, topographical data records, cartographic data records, routing data, and maneuver data. Other contents of the database 123 may include temperature, altitude or elevation, lighting, sound or noise level, humidity, atmospheric pressure, wind speed, the presence of magnetic fields, electromagnetic interference, or radio- and micro-waves, cell tower and wi-fi information, such as available cell tower and wi-fi access points, and attributes pertaining to specific approaches to a specific location.

The geographic database 123 may include historical traffic speed data for one or more road segments. The geographic database 123 may also include traffic attributes for one or more road segments. A traffic attribute may indicate that a road segment has a high probability of traffic congestion.

Figure 11:
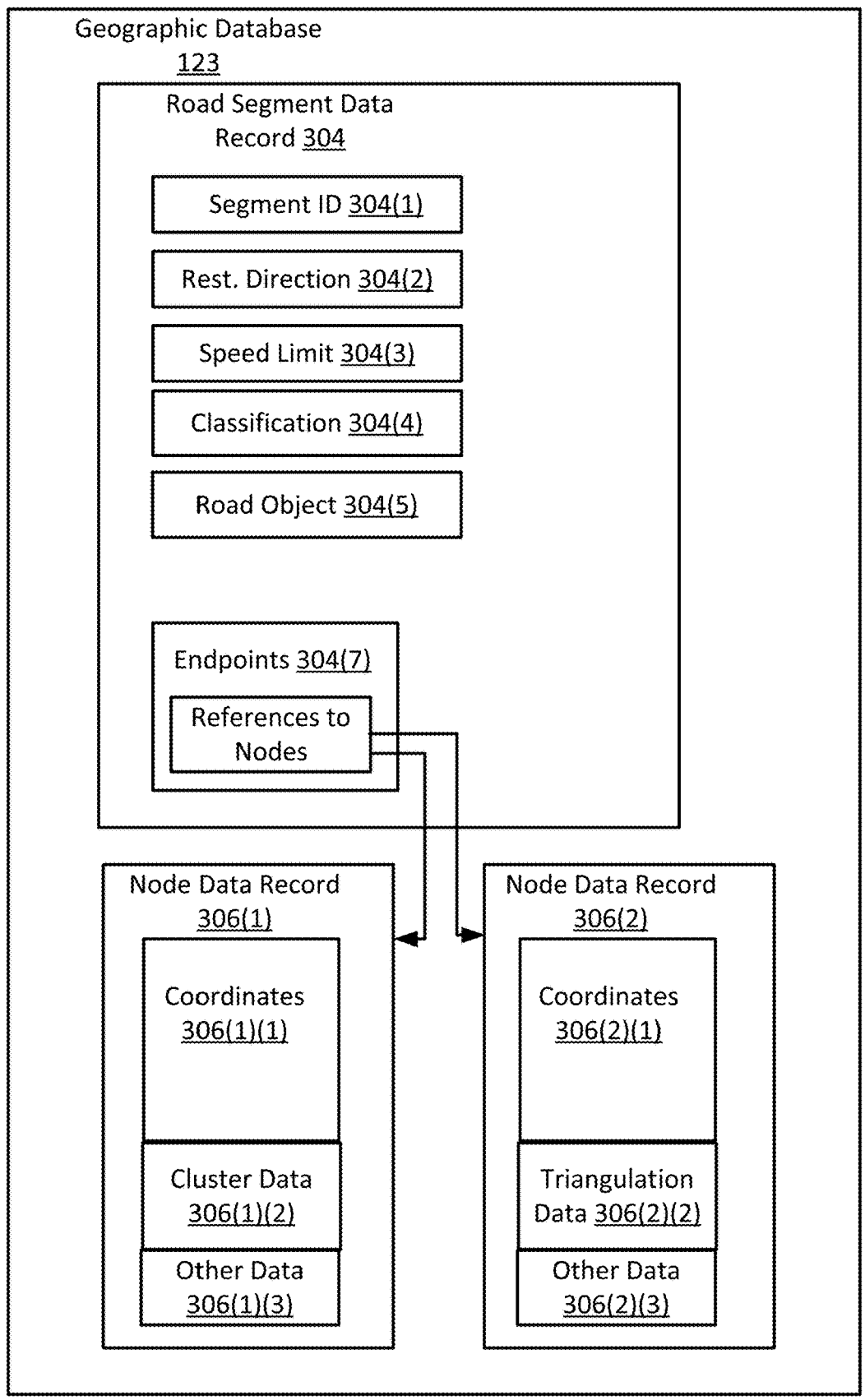

FIG. 11 depicts some of the components of a road segment data record 304 contained in the geographic database 123 according to one embodiment. The road segment data record 304 may include a segment ID 304(1) by which the data record can be identified in the geographic database 123. Each road segment data record 304 may have associated with its information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record may include location fingerprint data, for example a set of sensor data for a particular location.

The geographic database 123 may include road segment data records 304 (or data entities) that describe features such as road objects 304(5). The road objects 304(5) may be stored according to location boundaries or vertices. The road objects 304(5) may be stored as a field or record using a scale of values such as from 1 to 100 for type or size. The road objects may be stored using categories such as low, medium, or high. Additional schema may be used to describe the road objects. The attribute data may be stored in relation to a link/segment 304, a node 306, a strand of links, a location fingerprint, an area, or a region. The geographic database 123 may store information or settings for display preferences. The geographic database 123 may be coupled to a display. The display may be configured to display the roadway network and data entities using different colors or schemes.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment.

The road segment data record 304 may also include or be associated with other data 304(7) that refer to various other attributes of the represented road segment. The various attributes associated with a road segment may be included in a single road segment record, or may be included in more than one type of record which cross-references to each other. For example, the road segment data record 304 may include data identifying what turn restrictions exist at each of the nodes which correspond to intersections at the ends of the road portion represented by the road segment, the name, or names by which the represented road segment is identified, the street address ranges along the represented road segment, and so on.

FIG. 11 also depicts some of the components of a node data record 306 that may be contained in the geographic database 123. Each of the node data records 306 may have associated information (such as "attributes", "fields", etc.) that allows identification of the road segment(s) that connect to it and/or its geographic position (e.g., its latitude and longitude coordinates). The node data records 306(1) and 306(2) include the latitude and longitude coordinates 306(1)(1) and 306(2)(1) for their node, and cluster data 306(1)(2), which may include the centroids and boundaries for the clustering techniques described herein and/or triangulation data 306(2)(2), which may include the vertices for the triangulation techniques described herein. The cluster data 306 (1)(2) and triangulation 306(2)(2) may change dynamically or over time. The node data records 306(1) and 306(2) may also include other data 306(1)(3) and 306(2)(3) that refer to various other attributes of the nodes.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout a geographic region to observe features and/or record information about the roadway. Remote sensing, such as aerial or satellite photography, may be used. The database 123 may be incorporated in or connected to the server 125.

The geographic database 123 and the data stored within the geographic database 123 may be licensed or delivered on-demand. Other navigational services or traffic server providers may access the location fingerprint data, traffic data and/or the lane line object data stored in the geographic database 123.

The processor 200 and/or processor 300 may include a controller, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The databases 123 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases may include historical traffic speed data for one or more road segments. The databases may also include traffic attributes for one or more road segments. A traffic attribute may indicate that a road segment has a high probability of traffic congestion.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface of the display 211 may also include audio capabilities, or speakers. In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively, or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a)hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following example embodiments are also disclosed.
The following example embodiments of the invention are also disclosed:

Embodiment 1

A method for detecting an overhead obstruction comprising:
receiving, by a processor, three-dimensional data collected by a depth sensing device traveling along a path segment, wherein the three-dimensional data comprises point cloud data positioned above a ground plane of the path segment;
identifying, by the processor, data points of the point cloud data positioned within a corridor positioned above the ground plane;
projecting, by the processor, the identified data points onto a plane;
detecting, by the processor, the overhead obstruction based on a concentration of point cloud data positioned within a plurality of cells of the plane; and
storing the detected overhead obstruction above the path segment within a map database.

Embodiment 2

The method of embodiment 1, wherein the depth sensing device comprises a LIDAR collection device.

Embodiment 3

The method of embodiment 1 or 2, wherein the identifying of the data points comprises removing collected data points of the point cloud data positioned outside of the corridor.

Embodiment 4

The method of any of embodiments 1 to 3, wherein the projecting of the identified data points comprises matching the identified data points with location data associated with the depth sensing device within the plane.

Embodiment 5

The method of any of embodiments 1 to 4, wherein the plane is the ground plane of the path segment.

Embodiment 6

The method of any of embodiments 1 to 5, wherein the corridor is a volume between a lower plane positioned parallel with the ground plane and an upper plane positioned parallel with both the ground plane and the lower plane.

Embodiment 7

The method of any of embodiments 1 to 6, wherein the lower plane is in a range of 2-10 meters above the ground plane and the upper plane is in a range of 10-30 meters above the ground plane.

Embodiment 8

The method of any of embodiments 1 to 7, further comprising:
comparing depth data of the identified data points within the corridor to identify a presence of a static structure or non-static structure,
wherein the projecting of the identified data points onto the plane is conducted only for identified static structures.

Embodiment 9

The method of any of embodiments 1 to 8, wherein the detecting of the overhead obstruction comprises:
defining each cell of the plurality of cells as either an occupied status or a not-occupied status based on the concentration of the point cloud data with the cell being at least at a predefined threshold level or below the predefined threshold level, respectively;

creating a one-dimensional line segment for the path segment using the defined occupied and not-occupied statuses for each cell; and identifying the overhead obstruction when a series of consecutive cells of the plurality of cells is defined with the occupied status.

Embodiment 10

The method of any of embodiments 1 to 9, wherein the series of consecutive cells has at least a predetermined length.

Embodiment 11

An apparatus, configured to perform and/or control the method of any of embodiments 1-10 or comprising means for performing and/or controlling any of embodiments 1-10.

Embodiment 12

An apparatus, comprising at least one processor and at least one memory including computer program code for one or more programs, the at least one memory and the computer program code configured to, with the at least one processor, to perform and/or control the method of any of embodiments 1-10.

Embodiment 13

A computer program comprising instructions operable to cause a processor to perform and/or control the method of any of embodiments 1-10, when the computer program is executed on the processor.

The invention claimed is:

1. A method for detecting an overhead obstruction comprising:

receiving, by a processor, three-dimensional data collected by a depth sensing device traveling along a path segment, wherein the three-dimensional data comprises point cloud data positioned above a ground plane of the path segment;

identifying, by the processor, data points of the point cloud data positioned within a corridor positioned above the ground plane;

projecting, by the processor, the identified data points onto a plane;

detecting, by the processor, the overhead obstruction based on a concentration of point cloud data positioned within a plurality of cells of the plane; and storing the detected overhead obstruction above the path segment within a map database.

2. The method of claim 1, wherein the depth sensing device comprises a LIDAR collection device.

3. The method of claim 1, wherein the identifying of the data points comprises removing collected data points of the point cloud data positioned outside of the corridor.

4. The method of claim 1, wherein the projecting of the identified data points comprises matching the identified data points with location data associated with the depth sensing device within the plane.

5. The method of claim 1, wherein the plane is the ground plane of the path segment.

6. The method of claim 1, wherein the corridor is a volume between a lower plane positioned parallel with the ground plane and an upper plane positioned parallel with both the ground plane and the lower plane.

7. The method of claim 6, wherein the lower plane is in a range of 2-10 meters above the ground plane and the upper plane is in a range of 10-30 meters above the ground plane.

8. The method of claim 1, further comprising:

comparing depth data of the identified data points within the corridor to identify a presence of a static structure or non-static structure, wherein the projecting of the identified data points onto the plane is conducted only for identified static structures.

9. The method of claim 1, wherein the detecting of the overhead obstruction comprises:

defining each cell of the plurality of cells with either an occupied status or a not-occupied status based on the concentration of the point cloud data with the cell being at least at a predefined threshold level or below the predefined threshold level, respectively;

creating a one-dimensional line segment for the path segment using the defined occupied and not-occupied statuses for each cell; and identifying the overhead obstruction when a series of consecutive cells of the plurality of cells is defined with the occupied status.

10. The method of claim 9, wherein the number of the series of consecutive cells equals at least a predetermined longitudinal distance.

11. An apparatus for detecting an overhead obstruction over a path segment, the apparatus comprising:

a processor configured to receive three-dimensional data collected by a depth sensing device traveling along a path segment, wherein the three-dimensional data comprises point cloud data positioned above a ground plane of the path segment, identify data points of the point cloud data positioned within a corridor positioned above the ground plane, project the identified data points onto a plane, and detect the overhead obstruction based on a concentration of point cloud data positioned within a plurality of cells of the plane; and a map database configured to store the detected overhead obstruction above the path segment within the map database.

12. The apparatus of claim 11, wherein identification of the data points comprises a removal of collected data points of the point cloud data positioned outside of the corridor.

13. The apparatus of claim 11, wherein the projection of the identified data points comprises a match of the identified data points with location data associated with the depth sensing device within the plane.

14. The apparatus of claim 11, wherein the plane is the ground plane of the path segment.

15. The apparatus of claim 11, wherein the corridor is a volume between a lower plane positioned parallel with the ground plane and an upper plane positioned parallel with both the ground plane and the lower plane.

16. The apparatus of claim 11, wherein the processor is further configured to compare depth data of the identified data points within the corridor to identify a presence of a static structure or non-static structure, wherein the projection of the identified data points onto the plane is conducted only for identified static structures.

17. The apparatus of claim 11, wherein the detection of the overhead obstruction is based on a one-dimensional line segment for the path segment using an occupied status or a not-occupied status.

18. A non-transitory computer readable medium including instructions that when executed by a processor are configured to:
- receive three-dimensional data collected by a depth sensing device traveling along a path segment, wherein the three-dimensional data comprises point cloud data positioned above a ground plane of the path segment;
- identify data points of the point cloud data positioned within a corridor positioned above the ground plane;
- project the identified data points onto a plane;
- detect an overhead obstruction based on a concentration of point cloud data positioned within a plurality of cells of the plane; and
- store the detected overhead obstruction above the path segment within a map database.

19. The non-transitory computer readable medium of claim 18, wherein the instructions are further configured to:
- compare depth data of the identified data points within the corridor to identify a presence of a static structure or non-static structure, wherein the projection of the identified data points onto the plane is conducted only for identified static structures.

20. The non-transitory computer readable medium of claim 18, wherein the detection of the overhead obstruction comprises:
- define a status for each cell of the plurality of cells with either occupied or not-occupied based on the concentration of the point cloud data with the cell being at least at a predefined threshold level or below the predefined threshold level, respectively;
- create a one-dimensional line segment for the path segment using the occupied and not-occupied statuses for each cell; and
- identify the overhead obstruction when a series of consecutive cells of the plurality of cells is defined with an occupied status.

* * * * *